(12) United States Patent
Kim et al.

(10) Patent No.: US 10,503,732 B2
(45) Date of Patent: Dec. 10, 2019

(54) STORING TIME SERIES DATA FOR A SEARCH QUERY

(71) Applicant: Hewlett Packard Enterprise Development LP, Houston, TX (US)

(72) Inventors: Mijung Kim, Palo Alto, CA (US); Jun Li, Mountain View, CA (US); Manish Marwah, Palo Alto, CA (US); Krishnamurthy Viswanathan, Mountain View, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 511 days.

(21) Appl. No.: 15/027,842

(22) PCT Filed: Oct. 31, 2013

(86) PCT No.: PCT/US2013/067773
§ 371 (c)(1),
(2) Date: Apr. 7, 2016

(87) PCT Pub. No.: WO2015/065435
PCT Pub. Date: May 7, 2015

(65) Prior Publication Data
US 2016/0253381 A1    Sep. 1, 2016

(51) Int. Cl.
*G06F 16/2453*    (2019.01)
*G06F 16/2458*    (2019.01)
*G06F 16/2455*    (2019.01)

(52) U.S. Cl.
CPC .... *G06F 16/24532* (2019.01); *G06F 16/2477* (2019.01); *G06F 16/24568* (2019.01)

(58) Field of Classification Search
CPC ................. G06F 17/30551; G06F 16/2477
See application file for complete search history.

(56) References Cited

U.S. PATENT DOCUMENTS

| | | | |
|---|---|---|---|
| 5,299,262 A * | 3/1994 | Brickell | G06F 7/723 380/28 |
| 6,778,977 B1 | 8/2004 | Avadhanam et al. | |
| 7,025,724 B2 * | 4/2006 | Adam | A61B 8/587 600/437 |
| 7,373,302 B1 * | 5/2008 | Jastrzebski | A61B 5/0484 705/1.1 |
| 7,748,022 B1 * | 6/2010 | Frazier | G06F 17/30017 348/207.1 |
| 7,966,332 B2 | 6/2011 | Altevogt et al. | |
| 8,370,338 B2 | 2/2013 | Gordo et al. | |

(Continued)

FOREIGN PATENT DOCUMENTS

| | | |
|---|---|---|
| EP | 2750047 | 7/2014 |
| WO | WO-2013-038574 A1 | 3/2013 |

OTHER PUBLICATIONS

"Spatial, Temporal and Multimedia Databases", Jun. 1, 2012, 7 pages.

(Continued)

*Primary Examiner* — Charles E Lu

(57) ABSTRACT

Storing time series data for a search query includes identifying a time series whose representation is to be pre-computed based on available memory storage, pre-computing at least one representation of the identified time series, and storing the at least one representation in the memory storage.

19 Claims, 5 Drawing Sheets

(56) References Cited

U.S. PATENT DOCUMENTS

| | | | |
|---|---|---|---|
| 8,438,275 B1* | 5/2013 | Brooker | H04L 47/2408 709/224 |
| 8,510,236 B1 | 8/2013 | Kumar et al. | |
| 8,515,964 B2 | 8/2013 | Ravikumar et al. | |
| 8,952,991 B1* | 2/2015 | Kelley | G06Q 10/109 345/619 |
| 2004/0181522 A1* | 9/2004 | Jardin | G06F 17/30498 |
| 2006/0161546 A1* | 7/2006 | Callaghan | G06F 16/284 |
| 2007/0168336 A1 | 7/2007 | Ransil et al. | |
| 2009/0112818 A1 | 4/2009 | Jose et al. | |
| 2010/0070509 A1 | 3/2010 | Li et al. | |
| 2010/0135484 A1 | 6/2010 | Nishikawa et al. | |
| 2010/0318492 A1 | 12/2010 | Utsugi | |
| 2011/0078130 A1 | 3/2011 | Roizen et al. | |
| 2011/0078133 A1 | 3/2011 | Bordawekar et al. | |
| 2011/0106743 A1 | 5/2011 | Duchon | |
| 2012/0197898 A1 | 8/2012 | Pandey et al. | |
| 2012/0259843 A1 | 10/2012 | Child | |
| 2013/0060783 A1 | 3/2013 | Baum et al. | |
| 2013/0091105 A1 | 4/2013 | Bhave et al. | |
| 2013/0103657 A1 | 4/2013 | Ikawa et al. | |
| 2013/0103658 A1 | 4/2013 | Travis | |
| 2013/0151535 A1 | 6/2013 | Dusberger et al. | |
| 2013/0230255 A1 | 9/2013 | Wang et al. | |
| 2013/0238619 A1 | 9/2013 | Hanaoka et al. | |
| 2013/0246323 A1* | 9/2013 | Athas | G06N 5/02 706/46 |
| 2013/0254191 A1 | 9/2013 | He et al. | |

OTHER PUBLICATIONS

Cheng, J. et al; "Fast and Accurate Image Matching with Cascade Hashing for 3d Reconstruction"; http://www.nlpr.ia.ac.cn/jcheng/papers/CameraReady-CasHash.pdf, 8 pages.

Chou, J., et al.; "Parallel Index and Query for Large Scale Data Analysis"; Nov. 12-18, 2011; 11 pages.

Gil, M.S. et al, "Speed Up of Index Creation for Time-series Similarity Search with Handling Distortions", 2012, 2 pages.

Gosink, L. J., et al.; "Data Parallel Bin-based Indexing for Answering Queries on Multi-core Architectures"; 2009: 19 pages.

Nelluru, P; "Fast Approximate K-nearest Neighbors in High Dimensions"; May 8, 2013; http://apps.cs.utexas.edu/tech_reports/reports/tr/TR-2125.pdf, 35 pages.

Pasley, A. "Pattern Matching Against Distributed Datasets within DAME", Sep. 1, 2006, 32 pages.

"Proof of Concept for Hadoop: storage and analytics of electrical time-series", Jun. 20, 2012, 36 pages. Retrieved from the Internet <https://www.slideshare.net/Hadoop__Summit/proof-of-concent-with-hadoop>.

Faloutsos, et al., "Fast Subsequence Matching in Time-Series Databases", In SIGMOD Conference, 1994, 11 pages.

Berndt, et al., "Using Dynamic Time Warping to Find Patterns in Time Series", In KDD Workshop, Apr. 26, 1994, 12 pages.

Keogh, et al., "Dimensionality Reduction for Fast Similarity Search in Large Time Series Databases". Knowledge and Information Systems, vol. 3, Issue 3, 2001, 19 pages.

Ding, et al., "Querying and mining of time series data: experimental comparison of representations and distance measures". Proceedings of the VLDB Endowment, vol. 1 and 2, 2008, 11 pages.

Assent, et al., "The TS-Tree: Efficient Time Series Search and Retrieval", In Proceedings of the 11th international conference on Extending database technology: Advances in database technology (EDBI '08), 2008, 12 pages.

Lin, et al., "Experiencing SAX: a Novel Symbolic Representation of Time Series", Data Mining and Knowledge Discovery, vol. 15, Issue 2, 2007, 31 pages.

Korn, et al., "Efficiently Supporting Ad Hoc Queries in Large Datasets of Time Sequences", In SIGMOD Conference,1997, 25 pages.

Rakthanmanon, et al., "Searching and Mining Trillions of Time Series Subsequences under Dynamic Time Warping", In VLDB, 2012, 9 pages.

Wu, et al., "A Comparison of DFT and DWT Based Similarity Search in Time-Series Databases", In CIKM, 2000, 17 pages.

* cited by examiner

STORING TIME SERIES DATA FOR A SEARCH QUERY

BACKGROUND

Time series data can be data that is obtained from a sensor over a period of time. Such time series data can include long strings of data. During the diagnosis of a device, such as a network device or another type of device, the characteristics exhibited by the device can be compared to the time series data that has been recorded in a database. The time series data that matches or is at least similar to the characteristics exhibited by the device may aid in determining issues with the device.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Due to the long strings of data often involved with time series data, searching for a matching or similar time series to the data obtained from the device can take a significant amount of time. The principles described herein include a method that allows for faster searches of time series data when there is a sufficient amount of memory storage. For example, the principles described herein include a method for storing time series data for a search query that includes identifying a time series whose representation is to be pre-computed based on available memory storage, pre-computing at least one representation of the identified time series, and storing the at least one representation in the memory storage.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
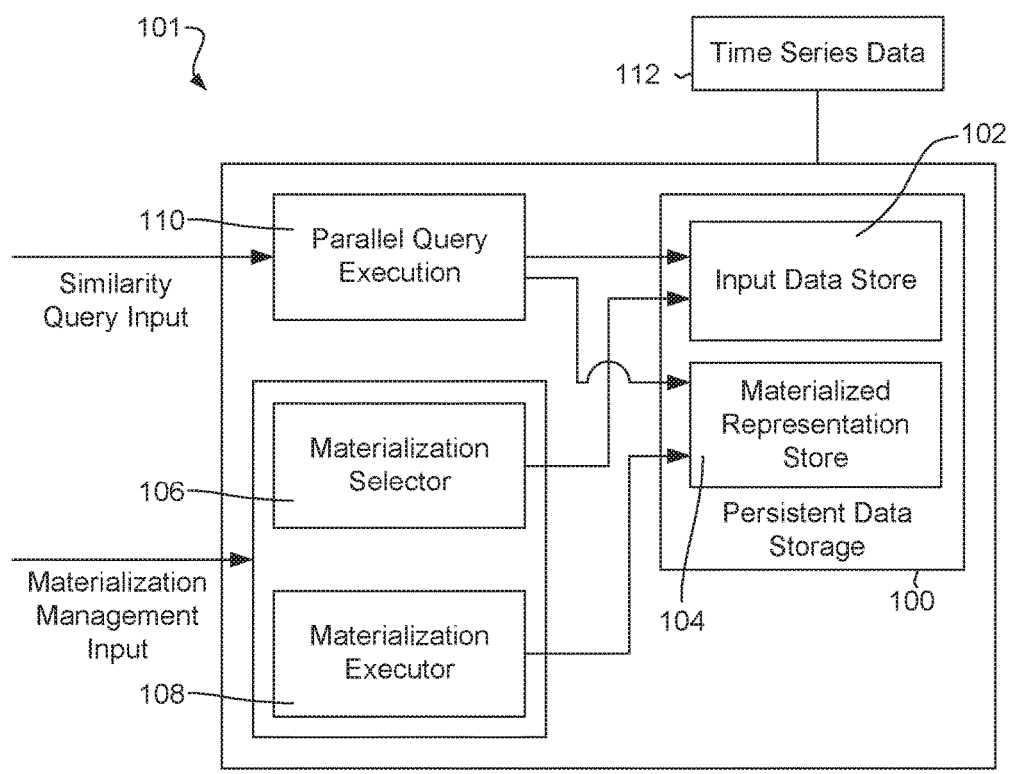
FIG. 1 is a diagram of an example of a storing system according to the principles described herein.

FIG. 1 is a diagram of an example of a storing system (101) according to the principles described herein. In this example, a persistent data storage (100) includes an input data store (102) and a materialized representation store (104). The persistent data store (100) is in communication with a materialization selector (106), a materialization executor (108), and a parallel query execution engine (110). The parallel query execution engine (110) receives similarity query inputs, and the materialization selector (108) and the materialization executor (110) receive materialization management inputs.

Time series data (112) is stored in the input data store (102). Time series data can include a sequence of data points that are measured at periodic points over time. Time series data can be used in any appropriate application. For example, time series data may be used in statistical applications, signal processing applications, pattern recognition applications, econometric applications, financial applications, weather forecasting applications, earthquake prediction applications, electroencephalography applications, human health monitoring applications, control engineering applications, astronomy applications, communication engineering applications, other applications, or combinations thereof.

The materialized representations of the time series data (112) can be stored in the materialized representation store (104). A materialized representation includes pre-computed information about the time series data that may result in shortened query search executions. For example, the materialized representation may include information taken from the time series data that is organized differently from the time series data, that includes less information than the time series data, that includes a snapshot of the time series data, that includes the indexing of the time series data, that includes transformations of the data, that includes other types of information, or combinations thereof. Depending on the characteristics of the time series data, a particular type of materialized representation may or may not help to shorten the query execution time. However, the materialized representations may be generated on a periodic basis before a search query input is received. As a result, at least one materialized representation is stored in the materialized representation store (104) at the time that the search query input is received. Thus, if a materialized representation exists that will reduce the amount of time to execute the search query at the time of receipt of the search query input, the search query execution time will be reduced. Under such conditions, the materialized representations are not generated in response to the search query inputs, but are rather pre-computed ahead of time.

Any appropriate type of materialized representation may be used in accordance with the principles described herein. For example, the materialized representation may include a cumulative sum representation, a Fast Fourier Transform (FFT) representation, another type of representation, or combinations thereof. The naïve or brute force approach may be executed based on any appropriate process. The naïve approach proceeds by comparing the query time series segment with each of the candidate segments in each time series. When comparing, the approach computes the distance between the query segment and each candidate segment and keeps track of the segment with the smallest distance. If k most similar segments are sought, then the segment with the k least distances are maintained and returned after all the segments are examined. An example of one such process is as follows:

function [index, dmin] = nnfftbf(data,query)
1. l = length(data);
2. m = length(query);

-continued

```
3. index = 1;
4. d_min = sum((data(1:m)-query)*(data(1:m)-query));
5. forp = 2:l-m,
      a. temp = sum((data(p:p+m-1)-query)*(data(p:p+m-1)-query));
      b. if (temp <d_min)
            i. d_min = temp;
            ii. index = p;
      c. End
6. end
```

The computational complexity of the brute force approach may be represented as $O((N_t)(n)(m))$ where Nt represents the total number of the time series in the database, n represents the size of the time series, and m represents the size or length of the query.

Further, the FFT approach may be executed based on any appropriate process. In this approach, the Fourier Transform of each time series is pre-computed ahead of time. Further, a cumulative sum of squares array is computed for each time series. In such an array, the i-th entry contains the sum of the squares of the first i values of the corresponding time series. At query time, the distance between the query and all the candidate time series segments is computed faster using the pre-computed fourier transform as well as the cumulative sum of squares. An example of one such process is as follows:

```
1. For each time series data_i , 1 <= i<= N_t
      a. Compute the length-(2n-1) fft of time series dataff_i =
   fft(data_i,2*n-1);
      b. Compute cumulative sum of squares of data_i ,cssq_i =
cum
      sum(data_i*data_i);
At query time call function [index, d_min] = nnfft(data_1,..., data_{N_t},
dataff_1, ..., dataff_{N_t}, query)
      1. fq=fliplr(query); /* Flip the query - reflect the query left to right
*/
      2. l = length(data_1); /* l is the length of each time series */
      3. m = length(query); /* m is the length of the query time series
   segment
      4. fq_1 = padarray(fq, [0,l-length(fq)],'post'); /*Pad query pattern with
   zeros */
      5. ffq_1 = fft(fq_1,2*/-1); /* Compute Fourier Transform of the query
   pattern */
      6. For each i, compute dqconv_i = ifft(dataff_i.*ffq_1); /*Compute
   convolution of time series i and query by computing the inverse
   fourier transform of the product of the fourier transform of the
   time series i and the query pattern */
      7. Set d_min = min_{i,p} cssq_i(p)-cssq_i(p-m)-2*dqconv_i(p)
   /*Compute the best candidate segment based on the convolution
   and the cumulative sum of squares */
      8. d_min = d_min + sum(query*query); /*Compute the distance of the
   best candidate segment */
```

The computational complexity of the FFT based implementation is $O((N_t)(n)(\log n))$, where Nt represents the total number of the time series in the database, n represents the size of each time series. Thus, the FFT based implementation will not depend on the length of the matching pattern (m) while the naive/brute-force implementation takes time linear in the length of the matching pattern. As a result, given a large time series database, there is a significant difference in response time for matching patterns for short versus long patterns.

While the examples above have been described with reference to specific representations, any appropriate type of representation may be used in accordance with the principles described herein. Further, while the examples above have been described with reference to specific processes, any appropriate type of process may be used in accordance with the principles described herein.

The persistent data storage may be any appropriate type of memory storage that is not a transmission storage medium in accordance with the principles described herein. For example, the persistent data storage may include, but is not limited to, non-volatile memory, memristor based memory, write only memory, flash memory, electrically erasable program read only memory, magnetic storage media, disk storage, optical storage, other types of memory, or combinations thereof.

The storing system (101) may determine which types of materialized representations are to be generated based on any appropriate policy. The policy may include a memory storage availability factor that is based on the amount of available memory storage to store the materialized representations. For example, if memory space is limited, the storing system (101) may decide to generate a single type of materialized representation that uses less memory for storage than other types of representations. On the other hand, if sufficient memory storage is available, the storing system (101) may decide to generate at least two types of materialized representations of the time series data.

In other examples, the storing system (101) selects specific time series data for which a materialized representation is to be made. Such a selection may be based, at least in part, on the frequency that the selected time series data is a result of search queries. The materialization selector (106) selects the time series data on which the materialized representation is to be made. The materialization executor (108) generates the materialized representations. The materialization management input may include specific factors based on the circumstances of the time series data, the current conditions of the storing system (101), the available memory space, other factors, or combinations thereof that may affect the decision of which time series data to select and which type of materialized representations to generate.

The parallel query execution engine (110) receives the similarity query input. Such an input may request results for time series data that is at least similar to a specified pattern. The search query may be based on the behavior of a particular system, and a purpose of the search may be to determine if such behavior existed in the past. If such a behavior is represented by the time series data, the user that inputted the search query input may be enabled to determine the meaning of the device's present behavior.

The parallel query execution engine (110) may perform multiple searches at a time to increase the speed of execution. For example, the parallel query execution engine (110) may search multiple machines simultaneously where each machine contains a subset of the total data set. A search query plan may be generated by the storing system (101) that may instruct the parallel query execution engine (110) on how to search the time series data while making use of the materialized representations. For example, the materialized representation may be used to determine a search plan for its respective time series data. The materialized representations may be reused each time the time series data is searched, which saves time and resources. One factor that may be used to make the search query plan may include the available memory space in the storing system (101). For example, if the available memory space is limited, the search query plan may be limited to searching the time series data and making use of just a first type of materialized representation that is less memory intensive than a second type of materialized representation. A premise for such a search query plan is that if there is limited memory space available, the storing system (101) will not be storing the materialized representations that are memory intensive. On the other hand, if there is sufficient memory available, the search query plan may include searching the time series data, and making use of a first type of materialized representation, a second type of materialized representation, another type of materialized representation, or combinations thereof because the storing system (101) is likely to be storing more than one type of materialized representation.

In some examples, the parallel query execution engine (110) is distributed across multiple machines. The input data store and the materialized representation store may also be distributed across multiple machines. In such an example, each of the machines may be dedicated to search the time series data that is stored local to the machine, while making use of the materialized representations that correspond to the time series data under search. Each of the machines may store a subset of the entire data set. Thus, by searching the machines in parallel, the entire data set may be searched quicker.

The input data store and the materialized representation store may both be distributed across multiple machines. On each machine, when conducting the search on the time series data stored local to that machine, it is desired to have the time series data and the corresponding materialized representations to store together on the same machine. For example, a first machine may include a first set of time series data and its corresponding materialized representations, a second machine may include a second set of time series data and its corresponding materialized representations, and so forth. The time series data and each materialized representation based on that time series data may share a common identifier. Based on this common identifier, the time series data and its corresponding materialized representations may be assigned to the same machine through the data re-partitioning mechanism.

Figure 2:
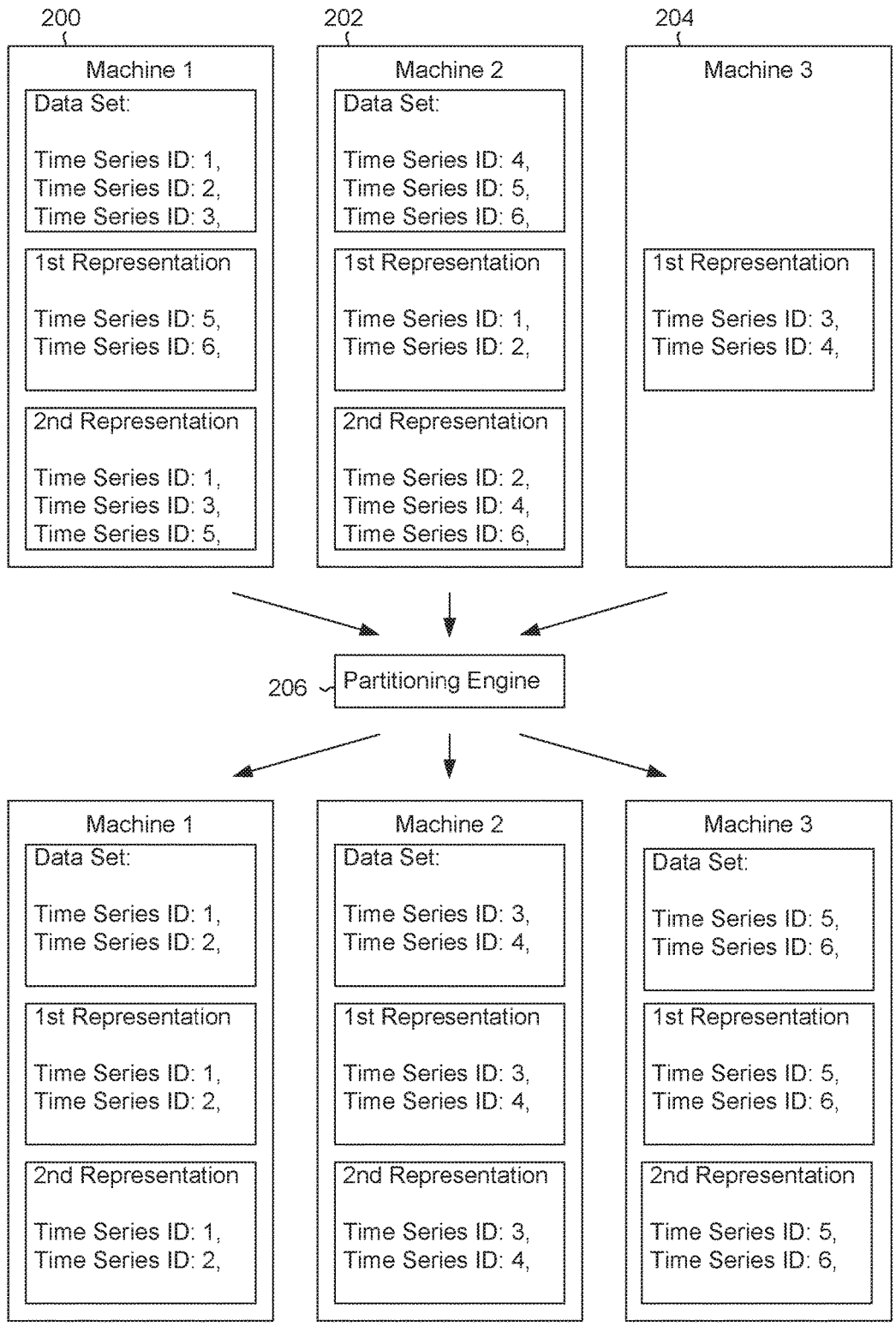
FIG. 2 is a diagram of an example of repartitioning time series data and representations according to the principles described herein.

FIG. 2 is a diagram of an example of repartitioning time series data and representations according to the principles described herein. In this example, time series data and corresponding materialized representations are distributed across a first machine (200), a second machine (202), and a third machine (204). The time series data and its corresponding representations may be assigned a common identifier.

Before repartitioning, the first time series is stored on the first machine (200), and its corresponding first representation is stored on the second machine (202). Also, the second time series is stored on the first machine (200) while its corresponding first and second representation are stored on the second machine (202). Likewise, the representations for the third, fourth, fifth, and sixth time series are not generally stored on the same machine with their base time series.

A partitioning engine (206) can reorganize where time series and representations are stored. For example, after the partitioning engine (206) repartitions the storing system, the first time series and its corresponding first and second representations are also stored on the same machine. Likewise, the second time series and its corresponding first and second representations are also stored on the same machine. Thus, after repartitioning is performed by the partitioning engine (206), each of the time series can be stored on the same machine with their corresponding representations.

In addition to co-locating the time series data with their corresponding representations, the partitioning engine (206) also distributes the data load across the machines so that the distribution is uniform. For example, each machine may store the time series data and their materialized representations having common identifiers. This uniform distribution of the time series data and the corresponding representations allows for uniform consumption of the storage space across the machines, and allows the query execution on the time series data stored on each local machine to finish almost at the same time, thus minimizing skewing effects.

Furthermore, due to the co-location, the machine that conducts the data processing has all or most of the desired data stored locally and thus can avoid remote data fetching from the other storage machines. This further speeds up data processing. In some examples, it is desirable for each time series (as a full data record) to be processed on a particular machine. Thus, the corresponding materialized representations will be co-located on the same machine for data processing. Further, it is desirable that the time series and the materialized data representations are uniformly distributed to the cluster machines that perform query execution, so that the different processing units on the machine will have an equal amount of the workloads to process and thus will have the execution finished approximately at the same time. Imbalance of the workloads on processing units can lead to longer query response times. Since the time series is labeled with a unique identifier, which may track an identifier of the sensor source, the partitioning engine (206) can partition and distribute the time series data and the materialized data representations based on the source identifiers.

The time series data and the materialized data representations can use the time series data source identifiers as the unique keys. The source identifiers will be chosen so that their hash results will be uniformly distributed, and thus the data will be re-partitioned uniformly across multiple machines. Each repartition procedure collects the time series data and the materialized representations that have the key's hash results that fall into a predetermined range. If the source identifier is not able to produce the uniform distribution, the source identifier will be substituted by a random universally unique identifier (UUID) to guarantee such uniform hash results. In such a situation, the storing system separately maintains the relationship between the original source identifier and the assigned UUID for each time series.

Repartitioning the data may occur on a periodic basis, an on demand basis, a threshold basis, another type of basis, or combinations thereof. In examples were a periodic basis is used, the time series data and it's materialized representations may be repartitioned on an hourly schedule, a daily schedule, a weekly schedule, a monthly schedule, another schedule, or combinations thereof.

A search query input may be received by the storing system at any appropriate time regardless of whether a repartitioning process has been recently performed. When a search query is executed, the parallel search query execution engine will cause the repartitioned data to be searched. In some examples, those time series and materialized representations that have not been repartitioned will not be searched. In yet other examples, those time series that are not repartitioned (i.e. time series data and representations are on separate machines) will have additional tasks to fetch the representation corresponding to the same machine as the time series when it is searched. Further, the naïve method can be used to search those time series.

Figure 3:
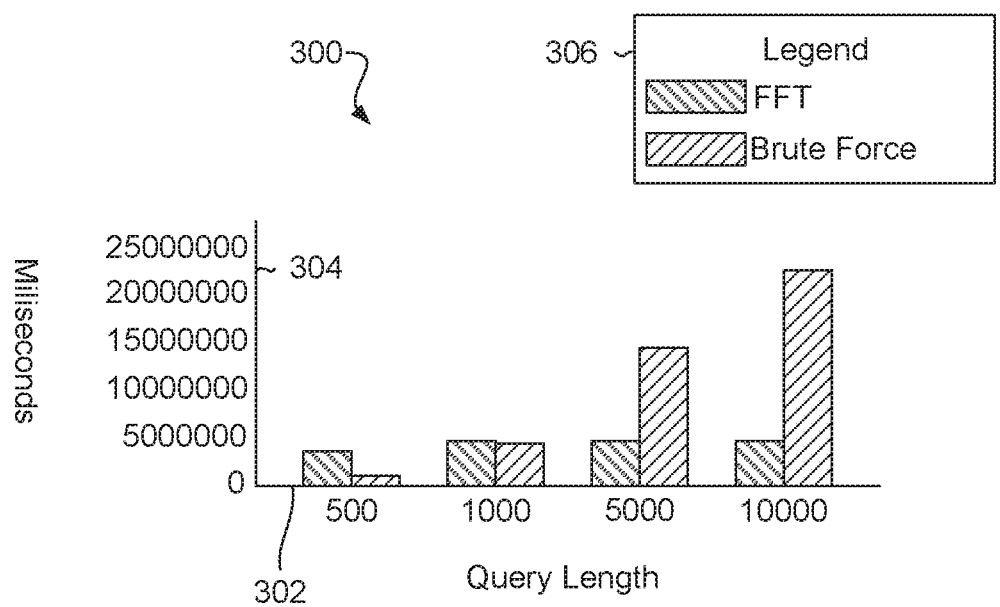
FIG. 3 is a chart of an example of query length against query response time according to the principles described herein.

FIG. 3 is a chart (300) of an example of query length against query response time according to the principles described herein. In this example, the x-axis (302) schematically represents a query length and the y-axis (304) schematically represents query response time in milliseconds. A legend (306) identifies the patterns that represent a naïve/brute-force representation and a FFTbased representation.

The naive/brute-force and the FFTbased representations can have different performance in terms of query response times for a given time series pattern to be matched. In the example of FIG. 3, the relationship of query response time to different time series data sizes and different sizes of the time series patterns to be matched is depicted. When the time series pattern to be matched falls into certain length (<1000), the naive/brute force representation can outperform the FFTbased representation. The percentage of the materialization can also impact which search implementation is chosen.

To achieve an optimum query response time, a query execution plan can consider multiple parameters. When a query is received, the query execution plan will decide which representation or representations to use. Such parameters may include the given time series length, the total size of the time series data in the database, the percentage of the materialization of the multiple data representations, other parameters, or combinations thereof.

Figure 4:
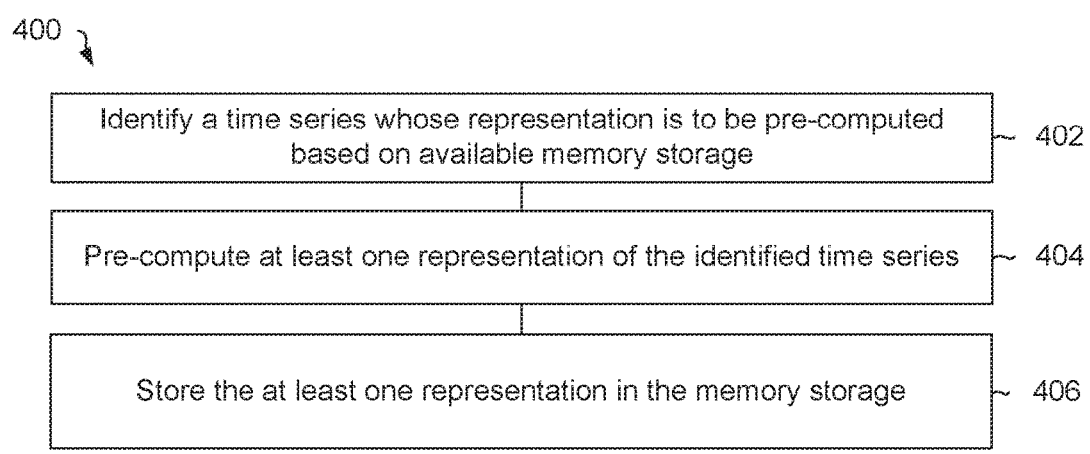
FIG. 4 is a diagram of an example of a method for storing time series data for a search query according to the principles described herein.

FIG. 4 is a diagram of an example of a method (400) for storing time series data for a search query according to the principles described herein. In this example, the method (400) includes identifying (402) a time series whose representation is to be pre-computed based on available memory storage, pre-computing (404) at least one representation of the time series, and storing (406) the at least one representation in the memory storage.

In some examples, the method may also include organizing the data such that each time series data is co-located on the same machine as each of the pre-computed representations of the time series data. When a search query input is received, an execution plan may be determined that accounts for the different pre-computed representations. For example, the search query plan may determine a specific execution plan that considers the characteristics of the search query input and the type of pre-computed representations. Such a search plan may include performing multiple searches in parallel across different machines to reduce the search query execution time.

The storing system can conduct the search to find the k time series segments that are most similar to a given query time series segment. The time series data is stored in the input data store, as part of the persistent data store. The input data store can be a shared storage environment to hold data contributed from different applications that handle different time series data or data that is not time series based. The time series data for an application is allocated by an information technology administrator with a storage capacity. Based on this allocated storage capacity, the materialization selector can decide what percentage of the time series data can have other data representations (or called materializations, which are different from the original input time series) to be stored in the materialized representation store.

A user may issue the similarity matching query against the stored time series data. The query may have two input parameters. The first parameter is a time series segment, called matching pattern, and the second parameter, k, is the number of the most similar time series segments that can be identified. The similarity matching query result is the k most similar time series segments (e.g., identified by the time series identifier and the offset of the segment within that time series). The similarity matching query is carried out by the parallel query execution engine. The execution engine performs query processing based on the stored time series data and the materialized data representations of the stored time series data.

The different pre-computed representations may include a FFT based representation and a cumulative sum representation based on the stored time series data. Both of these materialized representations are computed and then stored in the materialized representation store. At the query execution time, the materialized data representations are loaded into the execution engine and used for query processing.

In one example, the amount of storage used to store the time series data is S. Based on FFT approach, the storage used to store the FFT materialized representation is S multiplied by 4, and the storage used to store the cumulative sum materialized representation is S. Depending on the allocated storage capacity (e.g., in gigabytes) in the materialized representation store for the time series data, and the actual total storage space (e.g., in gigabytes) to store the time series data in the input data store, the percentage (P) of time series data that is allowed to be materialized can be computed.

The parallel execution engine for the similarity matching search is parallelized at the time series input source level (for example, a sensor device to produce smart metering data). Therefore, selective materialization at the granular level of the input sources does not break the parallelization. In an example where the materialized data representation of the input sources time series does not exist, the parallel execution engine will compute the corresponding data representations on-the-fly as part of the query processing.

The materialization selection strategy may include determining how to choose the candidates from the time series for materialization based on P. One strategy may include randomly picking from the percentage of the time series from the different input sources. Another strategy may include a time series similarity search that is driven from an application, such as an application that targets advertisement for customers living in the California state region. As a result, not all of the time series data in the entire database will be picked for the time series search. As a result, each time a query from the application is invoked, the query execution engine can increment a counter by one for each time series the search has scanned through. The higher count represents the higher frequency of historical query access to the time series data, and thus, the time series data may be given a higher chance for materialization.

In some examples, the method (400) includes deciding the storage budget for such multiple data representations, re-partitioning the time series data and the selectively materializing multiple data representations across various storage units so that the time series data records and their materialized data representations are co-located in the same storage units. Further, some examples of the method (400) may include executing the search query in parallel across multiple processing units by choosing a search implementation that is estimated to lead to the fastest response time where the estimates are computed based on the input query parameters and the materialization percentage.

Such a method provides benefits to multiple groups. For example, a large amount of data may be collected from timeseries data, such as data from physical sensors, financial systems, and system and application logs. These timeseries can be used for monitoring and managing the corresponding systems with the goal of characterizing usage, detecting anomalies, improving performance, and so forth. A common subtask in such tasks is searching for and identifying similar behavior in the large amount of timeseries data collected. For example, a physical device may show a particular temporal behavior (in terms of a measured property) when it is malfunctioning. To discover other similarly malfunctioning devices, a user could find devices that show a similar temporal behavior by searching for similar time series segments in a large number (e.g., millions) of time series. In other examples, utilities are replacing analog meters with digital smart meters, which can record user consumption data at a fine granularity (e.g., every 10 min). Searching for similar time series segments in the meter time series database can be used for finding similar customers, which in turn can be used for targeted marketing.

The method can also provide benefits to service providers. Such a method for time series can be incorporated into various databases and applications. Further, the time series can be part of an analysis tool for corporate finance, scientific research, economic applications, health monitoring, other applications, or combinations thereof. As a result, the method may be incorporated in analytics toolset, service applications, or the like.

Such a method may be beneficial to companies that want to offer big data analytics solutions and the corresponding computing platforms. This searching method can be packaged in a data analytics solution package. Further, the method can also exploit selective materialization of time series data representations such that query execution times can be shortened if persistent storage resources (disk based storage or persistent memory based storage) can be allocated to store these materialized representations.

Figure 5:
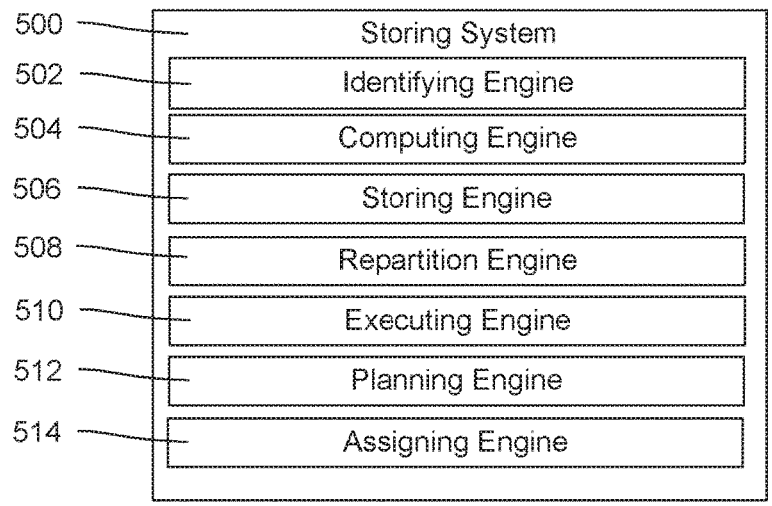
FIG. 5 is a diagram of an example of a storing system according to the principles described herein.

FIG. 5 is a diagram of an example of a storing system (500) according to the principles described herein. The storing system (500) may include any of the following engines: an identifying engine (502), a computing engine (504), a storing engine (506), a repartition engine (508), an executing engine (510), a planning engine (512), and an assigning engine (514). The engines (502, 504, 506, 508, 510, 512, 514) refer to a combination of hardware and program instructions to perform a designated function. Each of the engines (502, 504, 506, 508, 510, 512, 514) may include a processor and memory. The program instructions are stored in the memory and cause the processor to execute the designated function of the engine.

The identifying engine (502) identifies those time series data whose materialized representations are to be pre-computed prior to the receipt of a search query. The identifying engine (502) may use an identification policy to determine which time series to materialize. In some examples, the identification policy may include an available memory storage factor. Such an identification policy may also include factors that consider a length of the time series data to be searched, the amount of memory that will be consumed by a particular materialized representation, other characteristics of the materialized representations and time series data, or combinations thereof.

The computing engine (504) pre-computes at least one materialized representation of the time series. The materialized representation may include representations that speed up future query searches under certain conditions. The existence of such conditions may be determined when generating a search plan to execute a search query.

The storing engine (506) may store the time series data as well as the materialized representations. While the examples above have been described with reference to specific memory storage structures, any appropriate structures may be used. For example, an input data store section may store the time series data, a materialization store section may store the materialized representations, another type of memory storage may store the time series data and the materialized representations together, or combinations thereof.

The repartition engine (508) can organize the time series data and the materialized representations in any appropriate arrangement. Such an arrangement may decrease the time to execute a search query. For example, the repartition engine (508) may cause each of the time series data to be co-located on the same machine with its corresponding materialized representations. The assigning engine (514) may assign a common identifier to both the original time series data and its corresponding materialized representation. The repartition engine (508) may use these common identifiers to determine which time series data and the materialized representations should be assigned to the same machine. The repartition engine (508) may also cause the memory storage load across multiple machines to be substantially uniform.

In response to receiving a search query input, the planning engine (512) may generate multiple search query plans that can be used to search the time series data. The executing engine (510) executes a selected search plan to search for the information in the search query input. In some examples, the executing engine (510) executes searches in parallel across the machines. Further, each search may be dedicated to searching time series data stored on that machine, and make use of the corresponding materialized representations.

Figure 6:
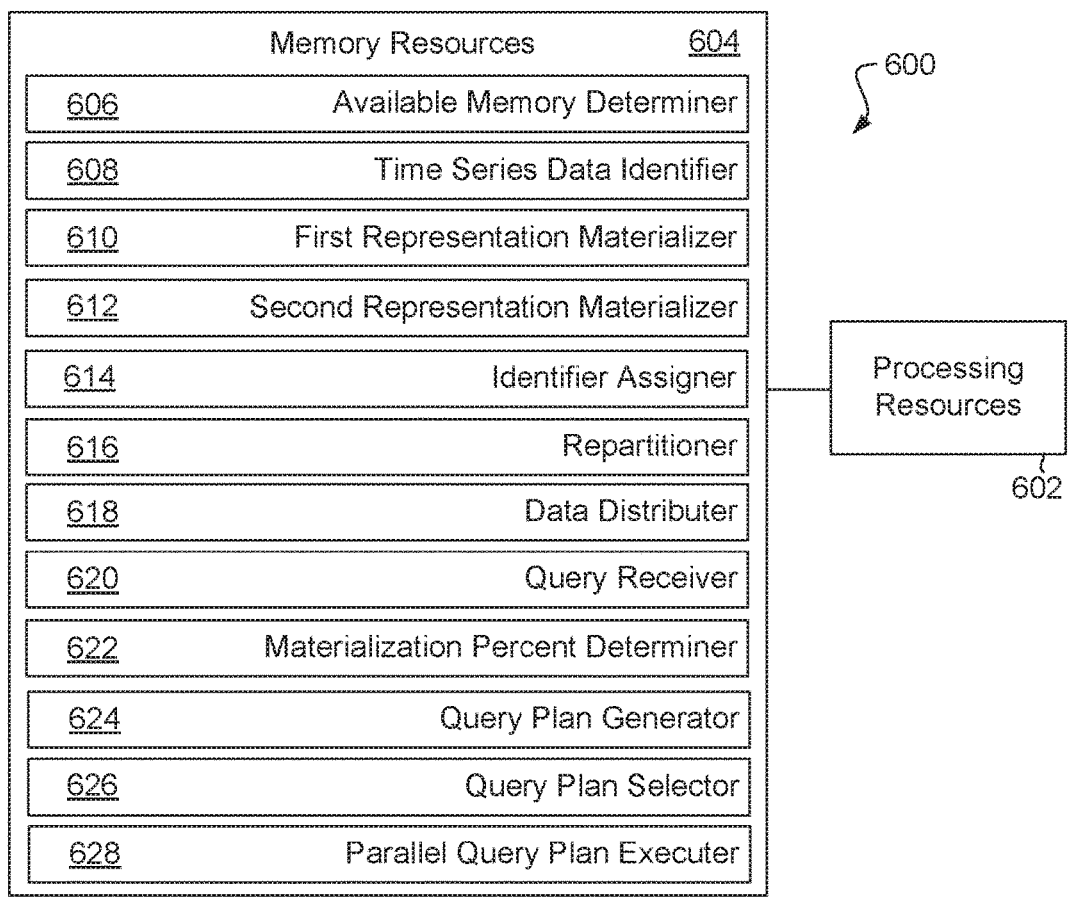
FIG. 6 is a diagram of an example of a storing system according to the principles described herein.

FIG. 6 is a diagram of an example of a storing system (600) according to the principles described herein. In this example, the storing system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the storing system (600). The programmed instructions shown stored in the memory resources (604) include an available memory determiner (606), a time series identifier (608), a first representation materializer (610), a second representation materializer (612), an identifier assigner (614), a repartitioner (616), a data distributer (618), a query receiver (620), a materialization percent determiner (622), a query plan generator (624), a query plan selector (626), and a parallel query plan executor (628).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The available memory determiner (606) represents programmed instructions that, when executed, cause the processing resources (602) to determine the amount of available memory in a storing system. The time series data identifier (608) represents programmed instructions that, when executed, cause the processing resources (602) to identify the time series data whose representation is to be pre-computed based on available memory storage. The first representation materializer (610) represents programmed instructions that, when executed, cause the processing resources (602) to generate a first type of materialized representation based on the pre-computations. Likewise, the second representation materializer (610) represents programmed instructions that, when executed, cause the processing resources (602) to generate a second type of materialized representation based on the pre-computations.

The identifier assigner (614) represents programmed instructions that, when executed, cause the processing resources (602) to assign identifiers to the time series data and to the materialized representations. In some examples, the original time series data and its corresponding materialized representations are assigned common identifiers. The repartitioner (616) represents programmed instructions that, when executed, cause the processing resources (602) to repartition the time series data and the materialized representation in any appropriate arrangement. In some examples, an arrangement includes that the original time series data is co-located on the same machine with their corresponding materialized representations. Further, the data distributor (618) represents programmed instructions that, when executed, cause the processing resources (602) to distribute the time series data and the materialized representations substantially uniformly across the available machines.

The query receiver (620) represents programmed instructions that, when executed, cause the processing resources (602) to receive search query inputs. The materialization percent determiner (622) represents programmed instructions that, when executed, cause the processing resources (602) to determine the materialization percent of the time series data. The query plan generator (624) represents programmed instructions that, when executed, cause the processing resources (602) to generate a plan for searching the time series data based on the search query input. In some examples, the search query plan is also based on the materialization percent. The query plan selector (626) represents programmed instructions that, when executed, cause the processing resources (602) to select one of the search plans generated by the query plan generator (624). The parallel query plan executor (628) represents programmed instructions that, when executed, cause the processing resources (602) to execute at least two searches in parallel.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, data structures, such as the libraries, may be accessed from a remote location over a network connection while the programmed instructions are located locally. Thus, the storing system (600) may be implemented on a user device, on a server, on a collection of servers, or combinations thereof.

The storing system (600) of FIG. 6 may be part of a general purpose computer. However, in alternative examples, the storing system (600) is part of an application specific integrated circuit.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for storing time series data for a search query, comprising:
    selecting, by a processor, time series data based on a frequency that the time series data was a result of previous queries, wherein the time series data is selected in order to pre-compute a representation of the time series data before a search query for the time series data is received;
    determining, by the processor, different types of representations of the time series data to pre-compute based on an amount of available memory storage;
    pre-computing, by the processor, the representations of the time series data based on information taken from the time series data, the representations being pre-computed according to the determined types before the search query for the time series data is received, wherein each of the representations of the time series data represents a pattern of the time series data;
    storing, by the processor, the representations of the time series data in the memory storage before the search query for the time series data is received; and
    in response to receiving the search query for the time series data, determining, by the processor, which representation of the time series data provides an optimum query response time based on parameters including a length of the search query and a length of the pattern of the respective representations of the time series data, and generating an execution plan for the search query based on the representation of the time series data that provides the optimum query response time.

2. The method of claim 1, further comprising repartitioning the memory storage so that the time series data and the representations of the time series data are stored on a common machine.

3. The method of claim 2, further comprising executing the search query based on the execution plan and the repartitioned memory storage.

4. The method of claim 1, further comprising uniformly distributing the time series data and the representations of the time series data along with other time series data and associated representations of the other time series data across multiple machines.

5. The method of claim 1, further comprising executing multiple searches of the search query in parallel across multiple machines.

6. The method of claim 1, wherein generating the execution plan for the search query comprises determining a search plan based on a materialization percentage of the time series data.

7. The method of claim 1, wherein the different types of representations of the time series data include a Fast Fourier Transform (FFT) based representation.

8. The method of claim 1, wherein the different types of representations of the time series data include a brute force based representation.

9. The method of claim 1, further comprising assigning the time series data and the representations of the time series data a common identifier.

10. A system for storing time series data for a search query, comprising:
a processor; and
a non-transitory computer readable medium storing instructions that when executed cause the processor to:
select time series data based on a frequency that the time series data was a result of previous queries, wherein the time series data is selected in order to pre-compute a representation of the time series data before a search query for the time series data is received;
determine different types of representations of the time series data to pre-compute based on an amount of available memory storage;
pre-compute the representations of the time series data based on information taken from the time series data, the representations being pre-computed according to the determined types before the search query for the time series data is received, wherein each of the representations of the time series data represents a pattern of the time series data;
store the representations of the time series data in the memory storage before the search query for the time series data is received; and
in response to receipt of the search query for the time series data, determine which representation of the time series data provides an optimum query response time based on parameters including a length of the search query and a length of the pattern of the respective representations of the time series data, and generate an execution plan for the search query based on the representation of the time series data that provides the optimum query response time.

11. The system of claim 10, wherein the instructions are executable to cause the processor to:
repartition the memory storage so that the time series data and the representations of the time series data are stored on a common machine; and
execute the search query based on the execution plan and the repartitioned memory storage.

12. The system of claim 10, wherein the instructions are to cause the processor to execute multiple searches of the search query in parallel across multiple machines.

13. The system of claim 10, wherein the instructions are to cause the processor to uniformly distribute the time series data and the representations of the time series data along with other time series data and associated representations of the other time series data across multiple machines.

14. The system of claim 10, wherein the instructions to cause the processor to generate the execution plan for the search query include instructions to cause the processor to determine a search plan based on a materialization percentage of the time series data.

15. A non-transitory computer readable storage medium storing instructions that, when executed, cause a processor to:
select time series data based on a frequency that the time series data was a result of previous queries, wherein the time series data is selected in order to pre-compute a representation of the time series data before a search query for the time series data is received;
determine different types of representations of the time series data to pre-compute based on an amount of available memory storage;
pre-compute the representations of the time series data based on information taken from the time series data, the representations being pre-computed according to the determined types before the search query for the time series data is received, wherein each of the representations of the time series data represents a pattern of the time series data;
store the representations of the time series data in the memory storage before the search query for the time series data is received;
in response to receipt of the search query for the time series data, determine which representation of the time series data provides an optimum query response time based on parameters including a length of the search query and a length of the pattern of the respective representations of the time series data, and generate an execution plan for the search query based on the representation of the time series data that provides the optimum query response time; and
execute the search query based on the execution plan.

16. The non-transitory computer readable storage medium of claim 15, wherein the instructions are to cause the processor to execute multiple searches of the search query in parallel across multiple machines.

17. The non-transitory computer readable storage medium of claim 15, wherein the instructions are to cause the processor to further uniformly distribute the time series data and the representations of the time series data along with other time series data and associated representations of the other time series data across multiple machines.

18. The non-transitory computer readable storage medium of claim 15, wherein the instructions to cause the processor to generate the execution plan for the search query include instructions to cause the processor to determine a search plan based on a materialization percentage of the time series data.

19. The non-transitory computer readable storage medium of claim 15, wherein the instructions are executable to cause the processor to:
repartition the memory storage so that the time series data and the representations of the time series data are stored on a common machine; and
execute the search query based on the execution plan and the repartitioned memory storage.

* * * * *